United States Patent
Yu

(10) Patent No.: US 8,093,744 B2
(45) Date of Patent: Jan. 10, 2012

(54) POWER MAINS DISTRIBUTION PANEL DATA LINK

(75) Inventor: Hong Yu, Hollis, NH (US)

(73) Assignee: Aboundi, Inc., Nashua, NH (US)

( * ) Notice: Subject to any disclaimer, the term of this patent is extended or adjusted under 35 U.S.C. 154(b) by 239 days.

(21) Appl. No.: 12/380,655

(22) Filed: Mar. 3, 2009

(65) Prior Publication Data

US 2010/0225161 A1 Sep. 9, 2010

(51) Int. Cl.
*H02J 1/00* (2006.01)
(52) U.S. Cl. .................................. 307/1; 307/3
(58) Field of Classification Search .................. 307/1–8; 340/310.11–310.18, 538–538.17
See application file for complete search history.

(56) References Cited

U.S. PATENT DOCUMENTS

| | | | |
|---|---|---|---|
| 6,590,493 B1 * | 7/2003 | Rasimas et al. | 340/538.12 |
| 6,952,159 B1 * | 10/2005 | Muller | 375/257 |
| 7,592,717 B2 * | 9/2009 | Yu | 307/66 |
| 2003/0156370 A1 * | 8/2003 | Yokoo | 361/62 |
| 2006/0176637 A1 * | 8/2006 | Kimura et al. | 361/118 |
| 2007/0010916 A1 * | 1/2007 | Rodgers et al. | 700/295 |
| 2007/0213879 A1 * | 9/2007 | Iwamura | 700/292 |
| 2008/0123872 A1 * | 5/2008 | Mankaruse et al. | 381/94.1 |
| 2008/0224536 A1 * | 9/2008 | Yamazaki | 307/1 |
| 2008/0238204 A1 * | 10/2008 | Yu | 307/66 |
| 2010/0225161 A1 * | 9/2010 | Yu | 307/1 |
| 2010/0225162 A1 * | 9/2010 | Yu | 307/3 |
| 2011/0080692 A1 * | 4/2011 | Yu | 361/631 |

* cited by examiner

*Primary Examiner* — Fritz M Fleming
(74) *Attorney, Agent, or Firm* — Joanne M. Martin

(57) ABSTRACT

A power mains distribution or breaker panel, and individual circuit breaker or relay therein having a circuit threacross providing a data path independent of the circuit breaker or relay operation. Alternate embodiments include circuits to control the data path and data path characteristics from data provided by either the line or load side of the power mains panel.

12 Claims, 1 Drawing Sheet

POWER MAINS DISTRIBUTION PANEL DATA LINK

BACKGROUND OF THE INVENTION

The present invention relates to data-over-power line (power mains) infrastructure, in particular, distribution or breaker panel systems having structures to provide data path continuity.

Data transmission over power mains (or any non-data wire medium) relies on the basic continuity of that medium on which to establish and maintain the data flow thereover. Once thought to obviate the need for data transfer because the connected equipment would be off, a circuit interrupted by an opened power mains circuit breaker or distribution panel relay would be acceptable. However, with the advent of devices having back-up power or passive devices connected to a power mains, there will still be a need for data transfer over a power mains circuit opened by a beaker or relay. Moreover, utility power load control makes potential data path interruption at peak data use more likely, exacerbating the need for data continuity over the power mains whether or not the equipment is powered by the circuit.

SUMMARY OF THE INVENTION

The present invention provides a power mains distribution or breaker panel, and individual circuit breaker or relay therein having a circuit threacross providing a data path independent of the circuit breaker or relay operation. Alternate embodiments include circuits to control the data path and data path characteristics from data provided by either the line or load side of the power mains panel.

BRIEF DESCRIPTION OF THE DRAWING

These and further features according to the present invention are better understood by reading the following Detailed Description, taken together with the Drawing, wherein.

DETAILED DESCRIPTION

Figure 1:
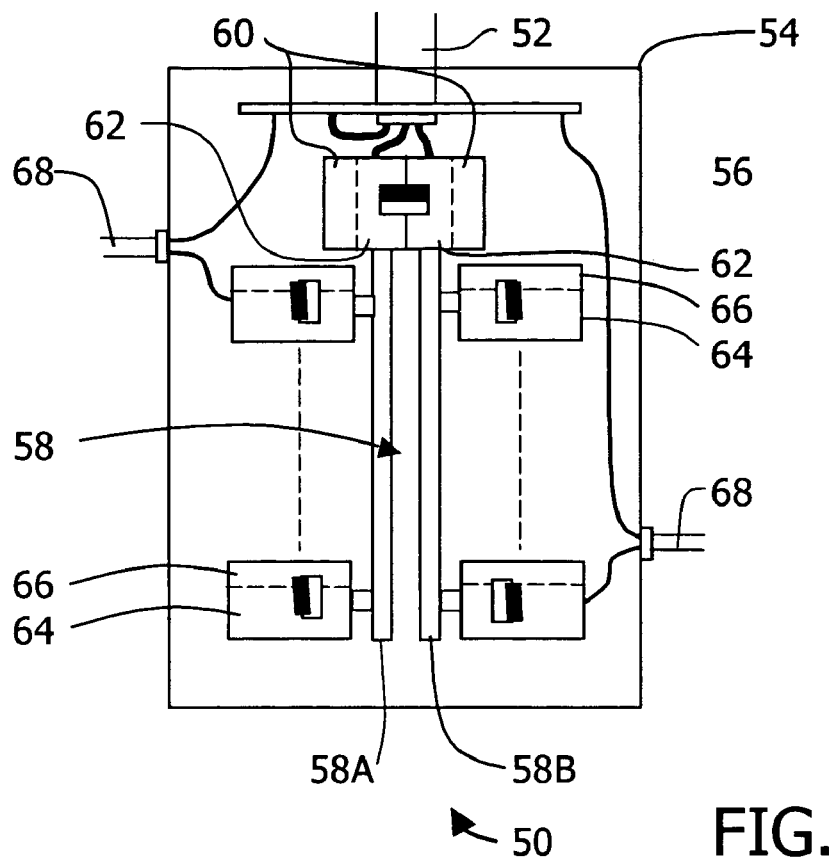
FIG. 1 is an elevation view of a typical circuit breaker panel according to one embodiment of the present invention.
Figure 2:
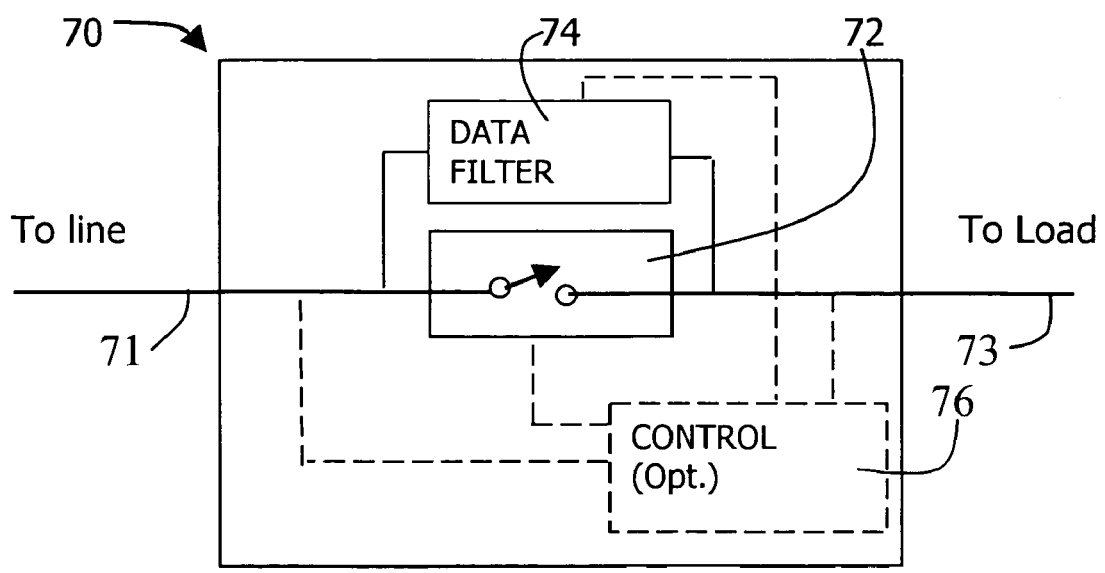
FIG. 2 is a block diagram of a circuit breaker/relay module having a data bridge according to one embodiment of the present invention.

A typical power distribution or circuit breaker panel physical layout 50 is shown in FIG. 1, wherein a 2-phase line side power mains connection 52, also called 'street side' connection, is shown entering the housing or box 54, and the non-neutral power mains wires are connected to a panel main breaker 56. A single phase or 3-phase implementation would have the corresponding number of main breakers, or omitted if that feature is provided elsewhere, e.g. with a cut-off switch or a breaker located in a distribution panel from which the power mains connection is supplied with power. The main breaker 56 may typically comprise a circuit breaker (or relay, controller, contactor, etc.) 60 for each phase of the power mains connection provided as is generally known in the art, and it may comprise a device controllable (open or closed state) by a signal from a control block as discussed below in reference to FIG. 2.

According to one embodiment of the present invention, a data coupler typically comprising a high-pass data filter 62 provides a data path parallel to the path provided by the (closed circuit) circuit breaker 60 and a substantially open circuit for the typically 50 or 60 Hz AC power control provided by the circuit breaker 60. According to the present invention, the data filter 62 may reside external to the circuit breaker 60 or be connected to the distribution bus and/or the input 52 directly, or be internal to the circuit breaker 60.

The mains power is then distributed from the circuit breaker 60 and the external data via data path filter 62 (or directly from the mains input 52 if the circuit breaker 60 is not provided) to a distribution bus 58 typically comprising an elongated conductive member, e.g. 58A and 58B for each phase of power to be distributed. A branch circuit 68 is connected to one (or more) phases through a corresponding circuit breaker 64 connected to a corresponding line-side phase as provided on one of the distribution bus member 58A, 58B. According to one embodiment of the present invention, a data coupler also comprising a data path filter 62 provides a parallel data path to a closed-circuit breaker, and the filter 62 data path remains active in the event that circuit breaker 64 becomes an open circuit to inhibit the flow of mains power. As above for the circuit breaker 60, the data filter 66 may be external and juxtaposed to said breaker, or disposed within the structure of the breaker 60, and may be connected to the distribution bus 58 and the branch circuit 68. Thus, in the above embodiment according to the present invention, a data path is maintained independent of the state of circuit breakers interposed between a connection to a power source and to the branch circuits.

The structure and function of a circuit breaker (or relay, etc.) is discussed generally with regard to the implementation 70 which includes a circuit breaker (or relay, etc.) 72 connected between the line side 71 (power mains input) and the load side 73 to which various loads (not shown) are connected. According to one embodiment of the present invention, a parallel data path is provided with a data filter 74 connected to parallel the closed-circuit path provided by the circuit breaker (when in close-circuit state) and provide at least as good a circuit pat as that normally provided by a closed-circuit breaker. A further feature according to the present invention is to provide an enhanced data path than that normally provided by a circuit breaker which by design or accident provide significant data loss even when close-circuited for power at the power mains frequency.

Typical data filter 74 (or 66) comprises a band-pass of 1-50 MHz more or less, and may comprise a capacitor, and inductive link or a more complex circuit to provide the desired filter characteristic. A further feature according to the present invention includes a controllable and/or adjustable parameter data filter 74 (or 66) wherein filter parameters such as On/Off, band-pass or cut, high- and low-pass characteristics, equalization parameters, etc., and an optional control module 76 to provide control signals to the data filter 74. Furthermore, the control module may itself receive data filter 74 control signals from either the line side connection 71 or the load side connection 73 for control of the data filter 74 operation and/or characteristics. Still further, the circuit breaker 72 can be selectively controlled (on/off) by the control module 76. In the further alternative, the circuit breaker may comprise a switch including a solid-state and non-mechanical switch.

Further modifications and substitutions made by one of ordinary skill in the art are considered within the scope of the present invention which is not to be limited except by the claims which follow.

What is claimed is:

1. A data-ready circuit breaker panel, comprising:
   a street mains connection;
   a branch circuit connection; and a first circuit breaker disposed to couple said street mains and said branch circuit and open said street mains and said branch circuit when at least one of power loads of said branch circuit are above a defined threshold and when manually opened, further including a first data coupler to provide a data path between said street mains and said branch circuit connection when said circuit breaker power connection is opened, wherein said data coupler comprises a data filter having controllable parameters, said first circuit breaker further includes a controller for controlling said data filter parameters, and wherein said controller receives control signals from at least one of said street mains connection and said branch circuit connection for control of said data filter operation and characteristics.

2. The data-ready circuit breaker panel of claim 1, further comprising a second circuit breaker connected between said first circuit breaker and said branch circuit connection.

3. The data-ready circuit breaker panel of claim 2, further including means for providing a data path between branch circuits independent of circuit breakers connected thereto.

4. The data-ready circuit breaker panel of claim 2, further including means for providing a data path between said branch circuit and said street mains connection.

5. The data-ready circuit breaker panel of claim 2 further including a power distribution bus to which said first and said second circuit breakers are connected.

6. The data-ready circuit breaker panel of claim 5, further including a second data coupler electrically connected to said power distribution bus and said branch circuit.

7. The data-ready circuit breaker panel of claim 6, wherein said second data coupler is disposed within said second circuit breaker.

8. A power distribution switch providing an open and a closed electrical path between a source of electrical power and an electrical load, further comprising:

a housing containing electrical contacts connected to said source of electrical power and said electrical load and providing said open and said closed electrical path; and a data filter electrically connected across said electrical contacts providing a data path across said electrical contacts independent of connection between said electrical contacts, wherein said data filter comprises a data filter having controllable parameters, said power distribution switch further includes a controller for controlling said data filter parameters, and wherein said controller receives control signals from at least one of said source and said load for control of said data filter operation and characteristics.

9. The power distribution switch of claim 8, wherein said data filter is disposed within said housing.

10. The power distribution switch of claim 8, wherein said electrical contacts form one of a circuit breaker and a relay.

11. The power distribution switch of claim 8, wherein said controller is adapted to control said electrical contacts in response to control signals received from at least one of said source and said load.

12. The power distribution switch of claim 8, wherein said data filter comprises a high-pass filter.

* * * * *